(12) United States Patent
Kirk et al.

(10) Patent No.: US 10,766,751 B2
(45) Date of Patent: Sep. 8, 2020

(54) SYSTEMS AND METHODS FOR A PUBLIC STANDARD INTERFACE FOR MATERIAL HANDLING VEHICLES

(71) Applicant: THE RAYMOND CORPORATION, Greene, NY (US)

(72) Inventors: John Bryant Kirk, Greene, NY (US); Dean Harvey, Cortland, NY (US); Rick Day, Port Crane, NY (US); Arlan Purdy, Alameda, CA (US); Richard C. Miller, III, West Lafayette, IN (US); Brian Moorhead, Wills, MI (US)

( * ) Notice: Subject to any disclaimer, the term of this patent is extended or adjusted under 35 U.S.C. 154(b) by 505 days.

(21) Appl. No.: 15/476,649

(22) Filed: Mar. 31, 2017

(65) Prior Publication Data

US 2017/0297880 A1 Oct. 19, 2017

Related U.S. Application Data

(60) Provisional application No. 62/322,379, filed on Apr. 14, 2016.

(51) Int. Cl.
*B66F 9/075* (2006.01)
*B60L 3/12* (2006.01)
(Continued)

(52) U.S. Cl.
CPC ............ *B66F 9/07572* (2013.01); *B60L 3/12* (2013.01); *B60L 53/16* (2019.02); *B60L 58/12* (2019.02);
(Continued)

(58) Field of Classification Search
CPC ...... B66F 9/07572; B60L 58/12; B60L 58/21; B60L 53/16; B60L 58/14; B60L 3/12;
(Continued)

(56) References Cited

U.S. PATENT DOCUMENTS 5,740,887 A * 4/1998 Unger ..................... B66F 11/04
180/65.51
8,341,449 B2 12/2012 Daniel et al.
(Continued)

FOREIGN PATENT DOCUMENTS

DE 102011100923 A1 10/2012
DE 102013114777 A1 6/2015
EP 2977256 A1 7/2015

OTHER PUBLICATIONS

English Translation of Abstract for DE 102013114777.
(Continued)

*Primary Examiner* — Sze-Hon Kong
(74) *Attorney, Agent, or Firm* — Quarles & Brady LLP (57) ABSTRACT

Provided are systems and methods for a public standard interface including a Battery Management System that allows for communication between an alternative energy source and a material handling vehicle. The alternative energy source may be a Lithium Ion Battery, a fuel cell, or another non-lead acid based battery. The Battery Management System is coupled with a CAN bus that allows for communication between the material handling vehicle and the alternative energy source. The CAN bus communicates information such as a type of the energy source, energy output limits, electric current limits and information such as an energy demand profile of the vehicle. Also included is an interface between the Battery Management System and Charger Control System.

19 Claims, 5 Drawing Sheets

(51) Int. Cl.
*B60L 58/21* (2019.01)
*B60L 58/12* (2019.01)
*B60L 53/16* (2019.01)
*B60L 58/14* (2019.01)

(52) U.S. Cl.
CPC .............. *B60L 58/14* (2019.02); *B60L 58/21* (2019.02); *B60L 2200/40* (2013.01); *B60L 2200/42* (2013.01); *B60L 2240/54* (2013.01); *B60L 2270/40* (2013.01); *Y02P 90/60* (2015.11); *Y02T 10/705* (2013.01); *Y02T 10/7011* (2013.01); *Y02T 10/7016* (2013.01); *Y02T 10/7044* (2013.01); *Y02T 10/7072* (2013.01); *Y02T 90/14* (2013.01); *Y02T 90/16* (2013.01)

(58) Field of Classification Search
CPC ............. B60L 2200/40; B60L 2200/42; B60L 2240/54; B60L 2270/40; Y02P 90/60; Y02T 10/7011; Y02T 10/7016; Y02T 10/7044; Y02T 10/705; Y02T 10/7072; Y02T 90/14; Y02T 90/16
See application file for complete search history.

(56) References Cited

U.S. PATENT DOCUMENTS

| | | | | |
|---|---|---|---|---|
| 8,427,103 | B2* | 4/2013 | Ohtomo | B60K 6/28 320/109 |
| 8,768,549 | B2 | 7/2014 | Erko et al. | |
| 9,013,323 | B2 | 4/2015 | Grothaus et al. | |
| 9,077,179 | B2 | 7/2015 | Kim et al. | |
| 9,285,433 | B2 | 3/2016 | Kurimoto | |
| 9,488,697 | B2 | 11/2016 | Harman | |
| 2003/0117112 | A1* | 6/2003 | Chen | H02J 7/0073 320/137 |
| 2003/0210014 | A1* | 11/2003 | Jabaji | H02J 7/0031 320/104 |
| 2004/0189248 | A1* | 9/2004 | Boskovitch | H02J 7/0021 320/116 |
| 2007/0029968 | A1* | 2/2007 | Costello | H02J 7/0036 320/116 |
| 2007/0108946 | A1* | 5/2007 | Yamauchi | H01M 10/42 320/132 |
| 2007/0114976 | A1* | 5/2007 | Inokuchi | H02J 7/1461 322/28 |
| 2009/0011639 | A1* | 1/2009 | Ballard | H01B 9/003 439/607.01 |
| 2009/0058355 | A1* | 3/2009 | Meyer | B60L 53/80 320/104 |
| 2010/0112843 | A1* | 5/2010 | Heichal | B60K 1/04 439/299 |
| 2010/0121511 | A1* | 5/2010 | Onnerud | H02J 7/0014 701/22 |
| 2011/0089905 | A1* | 4/2011 | Yano | B60K 6/46 320/132 |
| 2011/0093150 | A1* | 4/2011 | Yanagisawa | B60K 6/365 701/22 |
| 2011/0202218 | A1* | 8/2011 | Yano | B60L 3/12 701/22 |
| 2011/0258838 | A1* | 10/2011 | McCabe | H01M 10/44 29/593 |
| 2012/0091824 | A1* | 4/2012 | Campolo | H01R 13/703 307/135 |
| 2013/0100563 | A1* | 4/2013 | Cho | H02H 3/08 361/63 |
| 2013/0116868 | A1 | 5/2013 | Erko et al. | |
| 2013/0175857 | A1* | 7/2013 | Shreevani | B60L 3/0023 307/9.1 |
| 2013/0304287 | A1 | 11/2013 | Marwell | |
| 2014/0145853 | A1* | 5/2014 | Chang | G01R 19/16542 340/636.15 |
| 2014/0239964 | A1* | 8/2014 | Gach | H02J 7/0021 324/433 |
| 2014/0266779 | A1* | 9/2014 | Grothaus | H04W 4/70 340/870.02 |
| 2014/0277887 | A1 | 9/2014 | Slattery et al. | |
| 2015/0046106 | A1* | 2/2015 | Wade | H04Q 9/00 702/63 |
| 2015/0048781 | A1* | 2/2015 | Walde | H02J 7/0021 320/106 |
| 2015/0158392 | A1* | 6/2015 | Zhao | B60L 58/22 320/109 |
| 2015/0318727 | A1* | 11/2015 | Vogel | H02J 7/027 320/107 |
| 2016/0036256 | A1* | 2/2016 | Sukup | H02J 7/0052 320/107 |
| 2016/0078694 | A1* | 3/2016 | Swift | G05B 15/02 701/34.2 |
| 2016/0082772 | A1* | 3/2016 | Biderman | A61G 5/045 301/6.5 |
| 2016/0096444 | A1* | 4/2016 | Chen | B60L 11/1864 701/22 |
| 2016/0101705 | A1* | 4/2016 | Kuraishi | B60L 53/60 |
| 2016/0276858 | A1 | 9/2016 | Davis | |
| 2017/0008402 | A1* | 1/2017 | Thomas | B60L 3/0046 |
| 2017/0033408 | A1* | 2/2017 | O'Hora | H01M 10/425 |
| 2017/0052585 | A1* | 2/2017 | Podolefsky | H01M 10/625 |
| 2017/0190257 | A1* | 7/2017 | Chuang | B60L 53/00 |
| 2017/0254856 | A1* | 9/2017 | Shiraishi | B60R 16/03 |
| 2018/0034504 | A1* | 2/2018 | Kirk | G07C 5/008 |
| 2019/0081363 | A1* | 3/2019 | Brenner | H01M 10/425 |

OTHER PUBLICATIONS

English Translation of Abstract for DE 102011100923.
Sited in the European Search Report as: Chademo Association: "CHAdeMO Connector Interface", Jan. 1, 2010 (Jan. 1, 2010), XP055094554, Retrieved from the Internet: URL:http://www.chademo.com/pdf/interface.pdf, author unknown; 6 pages.
European Search Report; Appln No. 17166567.2; dated Sep. 7, 2017; 12 pages.
Machine Translation of EP2977256 Abstract; 1 page.
Smart Battery Data Specification, Revision 1.1, SBS-Implementers Forum, Dec. 11, 1998. 54 pages.

* cited by examiner

SYSTEMS AND METHODS FOR A PUBLIC STANDARD INTERFACE FOR MATERIAL HANDLING VEHICLES

CROSS REFERENCE TO RELATED APPLICATIONS

This application claims priority to U.S. Provisional Application No. 62/322,379 filed on Apr. 14, 2016, and titled "Systems and Methods for a Public Standard Interface for Material Handling Vehicles," which is hereby incorporated by reference.

STATEMENT OF FEDERALLY SPONSORED RESEARCH OR DEVELOPMENT

Not applicable.

FIELD OF THE INVENTION

This invention was made with the support of the New York State Energy Research and Development Authority (NYSERDA) under Agreement Number 46187 and NYSERDA may have rights in this invention. The Raymond Corporation developed this interface in concert with Navitas Systems, LLC and supported by the New York State Energy Research and Development Authority.

The present invention relates to communication between an energy source and a material handling vehicle. More particularly, the invention relates to systems and methods for implementing a public standard interface between a Truck Control System (TCS) and a Battery Management System (BMS), which provides for communication between an alternative energy source and a material handling vehicle. Also it provides BMS communication to a Charger Control System (CCS) to support BMS control of the charging process of new battery technologies, such as Lithium Ion Batteries (LIB), which are increasingly replacing Lead Acid Batteries (LAB).

BACKGROUND

Material handling vehicles are commonly found in warehouses, factories, shipping yards, and, generally, wherever pallets, large packages, or loads of goods are required to be transported from place to place. Material handling vehicles typically include load bearing forks for lifting packages or pallets for transporting, a drive motor for propelling the truck, a steering control mechanism, and a brake.

A common energy source for electrically based material handling equipment is a Lead Acid Battery (LAB). LABs are robust and have historically been inexpensive, but a drawback to such batteries is that a lead acid battery may not provide the desired power needs of modern heavy use material handling vehicles. Although LABs have traditionally been more cost effective than alternative energy sources, improvements in the field of alternative energy source technology have led to lower costs and fewer environmental concerns for new alternative energy sources. Furthermore, concerns with LABs, such as difficulties encountered when charging or rapidly recharging these batteries without damaging them, have also led to a desire for new energy sources to be used by industrial material handling vehicles.

New alternative energy sources, such as fuel cells or Lithium Ion Batteries (LIBs), can be completely recharged or charged with high currents in less time than lead acid batteries with little or no damage. However, an important advantage that LABs have is that most existing material handling vehicles are designed to work with the voltage declines of LABs. Such material handling vehicle designs are typically not compatible with how LIBs or fuel cells behave. For example, LIBs or fuel cells may automatically disconnect, or may not be able to handle typical current draws, for example, at very low temperatures. These considerations make it unpractical to simply plug in a new energy source to a material handling vehicle and run the material handling vehicle until a power cutout.

Another important consideration is that most material handling vehicle computer systems are not programmed to address the limits of new energy sources before a power cutout occurs. Typically, the TCS for existing material handling vehicles will shut down functions, such as Lift, to indicate to maintenance personnel to service the LAB. This function is based on sensing a voltage drop that does not occur with a LIB or other new energy sources. When using a LAB, vehicle performance will decline as the LAB State of Charge declines, but a LAB will not suddenly shut down the vehicle while it is in operation. New energy sources, such as a LIB or a Fuel Cell, must shut down operation for protection of the energy source.

Furthermore, extending operation hours of the material handling vehicle using a new energy source can potentially result in damage to the energy source. For instance, LIBs may brick. Bricking occurs when a LIB's charge is reduced to near 0% State of Charge and any cell of the LIB is pulled below the minimum voltage limit. Thus, the energy source could be permanently damaged. Operating a LAB to 0% battery state of charge does shorten the battery life, but unlike with LIBs, a LAB can recover from such an event.

Importantly, there is currently no standardized way for a material handling vehicle to detect what type of power source is being utilized or for the material handling vehicle to adjust its behavior to the limits of that power source, or to adjust its behavior to handle an indication of battery energy depletion, or to communicate or record the status or specific data (for example fault codes) from that power source. Many current material handling vehicle designs assume that the power source will behave like a LAB.

Therefore, it is desirable to provide a public standard interface for communication between the Truck Control System and the energy source control system, which is typically called a Battery Management System.

SUMMARY OF THE INVENTION

The present invention provides for systems and methods for implementing a public standard interface for a material handling vehicle including an energy source that includes a battery management system, a CAN bus coupled to the battery management system and in communication with a truck control system of the material handling vehicle. The battery management system is operable to communicate a type of the energy source, one or more limits of the energy source, and a disconnect warning.

In one form, the system includes a WAKE line that influences the battery management system and controls a battery disconnect switch. In another embodiment, the battery management system communicates with the truck control system via the CAN bus. In yet another form, the battery management system receives the Minimum Voltage for the TCS (i.e., the EDP Min Voltage) from the truck control system. In another embodiment, the CAN bus uses a communication protocol utilizing little endian communication. In still another embodiment, the one or more limits includes a maximum discharge current and a maximum regeneration current. In yet another embodiment, the CAN bus comprises an H line, an L line, and a WAKE line which are included in the same connector that carries power from the energy source. In still a further form, the energy source is a Lithium Ion battery.

In one embodiment, a system implementing a public standard interface includes a lithium ion battery having a battery management system in communication therewith and a CAN bus in communication with a material handling vehicle and the battery management system. The battery management system is operable to communicate a weight of the lithium ion battery, one or more limits of the energy source, and a disconnect warning. In another form, the system implementing the public standard interface is in communication with a truck control system that communicates using the CAN bus. In another form, the battery management system receives the Minimum Voltage for the TCS (i.e., the EDP Min Voltage) from the truck control system via the CAN bus. In yet another form, the one or more limits include a maximum discharge current and a maximum regeneration current.

In yet another form, the battery management system controls a battery disconnect switch based on the WAKE line and other factors monitored by the battery management system. In one embodiment, a method of communication between a material handing vehicle and a battery management system includes providing a communication protocol to the material handling vehicle, controlling an energy source disconnect switch, transferring energy source information between the material handling vehicle and the battery management system, and determining a type of the energy source.

In one embodiment, the energy source information includes a weight of the energy source. In one form, the energy source information includes an electric current output limit, a power output limit, and an energy output limit of the energy source. In some embodiments, the energy source information includes a current limit for the energy source. In some embodiments, the method includes determining a minimum level of energy at which the energy source requires maintenance. In some embodiments, the method includes determining a maximum discharge current and a maximum regeneration current.

In yet another embodiment, a method of communication between a battery management system and a charger control system includes providing a communication protocol to the charger, controlling the charging process by setting current and maximum voltage levels, transferring energy source information between the battery management system and the charger for display on the charger, determining a type of the energy source, and providing for automatic shutdown of the charging electric current if the connection between the battery management system and the charger control system is broken.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
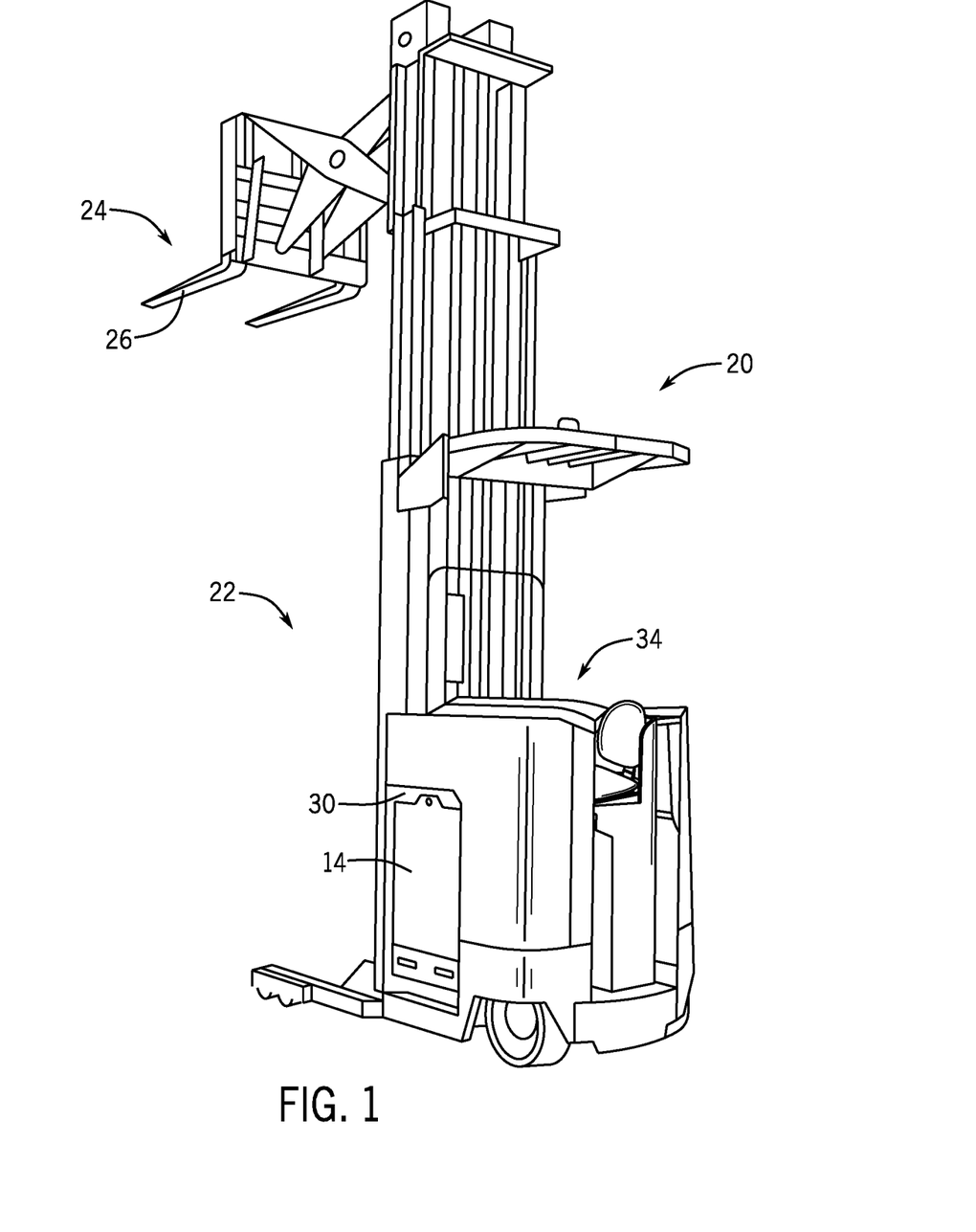
FIG. 1 is a perspective view of a material handling vehicle utilizing a standard interface according to the present disclosure.

It is also to be appreciated that material handling vehicles are designed in a variety of configurations to perform a variety of tasks. Although the material handling vehicle described herein is shown in the figure as a reach truck, it will be apparent to those of skill in the art that the present invention is not limited to vehicles of this type or purpose, and can also be provided in various other types of material handling vehicle configurations, including, for example, pallet trucks, order pickers, narrow-aisle turret trucks, and any other material handling vehicle.

Turning to the figures, the following description and drawing figures pertain to embodiments of the invention directed to a system implementing a public standard interface including a Battery Management System (BMS) and an alternative energy source that provides power to a material handling vehicle. The BMS is connected to an energy source, which is preferably a Lithium Ion battery (LIB) or a fuel cell, but it will be apparent to one having ordinary skill in the art that other rechargeable batteries may be used including, but not limited to: a flow battery such as a vanadium redox battery, a zinc-bromine battery, or a zinc-cerium battery; a Lithium air battery; a Lithium-ion battery such as a beltway battery, a Lithium ion manganese oxide battery, a lithium ion polymer battery, a lithium iron phosphate battery, a lithium-sulfur battery, or a Lithium-titanate battery; a molten salt battery; a nickel-cadmium battery; a nickel hydrogen battery; a nickel-iron battery; a nickel metal hydride battery; an organic radical battery; a polymer-based battery; a polysulfide bromide battery; a potassium-ion battery; a rechargeable alkaline battery; a rechargeable fuel battery; a silicon air battery; a silver-zinc battery; a silver calcium battery; a sodium-ion battery; a sodium-sulfur battery; a sugar battery; a super iron battery; or an ULTRA-BATTERY®.

Most material handling vehicles currently use only Lead Acid battery (LAB) technology for traction power and lifting. By using a LIB or other new energy source, the following potential improvements result over the current use of LABs. First, a wider temperature range of operations can be achieved, for example within freezers. Second, opportunity charging can be achieved. Opportunity charging is the act of charging a battery during break time, lunch time, or any opportunity that presents itself during the work day. Third, because LIBs and Fuel Cells have a higher energy per volume, new truck designs can be achieved for historically difficult spaces, such as narrow aisles. Finally, very low maintenance is required for LIBs compared to flooded LABs. The purpose of this specification is to provide a standard for manufacturers of lithium ion batteries and material handling vehicles that defines the interface between a lithium energy source and the vehicle. Also this specification defines the interface between the lithium energy source and the charger. This standard is now public for all manufacturers, including manufacturers of vehicles, batteries, chargers, etc.

Referring to FIG. 1, a material handling vehicle 20 embodying an aspect of the invention is shown. The material handling vehicle 20 includes a body 22, a fork carriage 24 with at least one load bearing fork 26, a motor compartment (not shown) housing a motor (not shown), an energy source compartment 30 for housing an energy source 14, a battery management system (BMS) 12, and an operator compartment 34.

The terms State Of Charge (SOC) and Battery State of Charge (BSOC) are used with these definitions: BSOC is the number displayed on the truck for the operator, also called Display BSOC. BSOC ranges from 100%=100% SOC to 0%=some real SOC above 0% SOC. What 0% Display BSOC means is the operator should go charge the battery even though it may support operation for some time before the BMS must disconnect to protect the battery. Depending on the energy source chemistry, the energy source 14 may be damaged if any one cell therein is reduced to 0% State of Charge (SOC). The BMS 12 can consume power as long as it is "awake," and holding the energy source disconnect switch closed also consumes power. Therefore, certain features in the hardware and software of the BMS 12 are provided to protect the energy source 14 during storage while inside the material handling vehicle 20, or stored outside of the material handling vehicle 20. The BMS takes action when the SOC reaches a Minimum Storage Charge (MSC) level. Typically MSC is about 20% SOC or lower.

Figure 2:
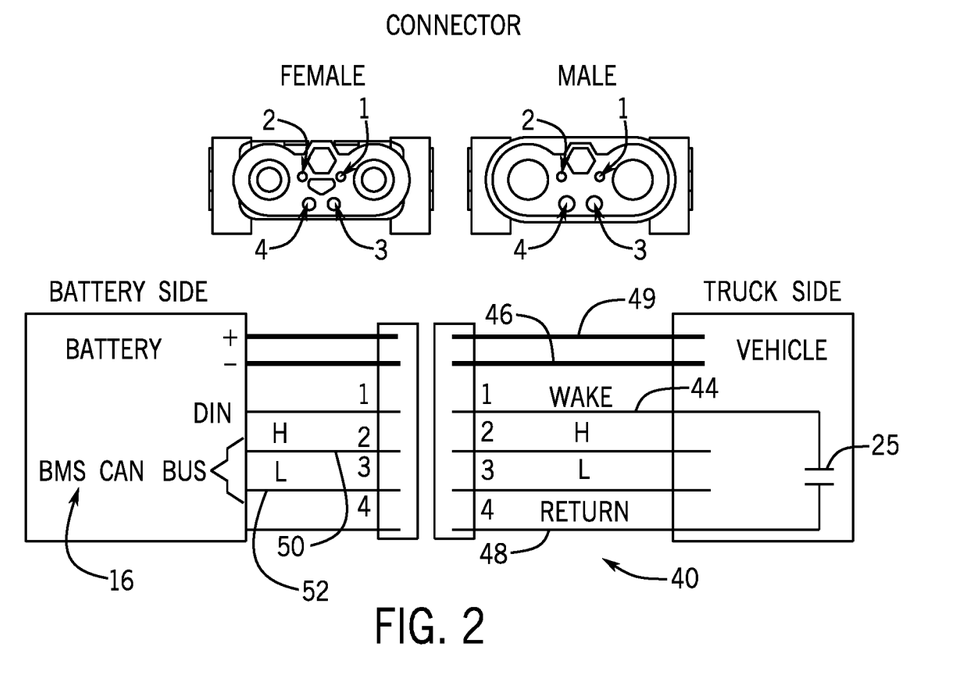
FIG. 2 is an example signal wire pinout for an EBC type connector between an embodiment of a battery management system and a material handling vehicle.
Figure 3:
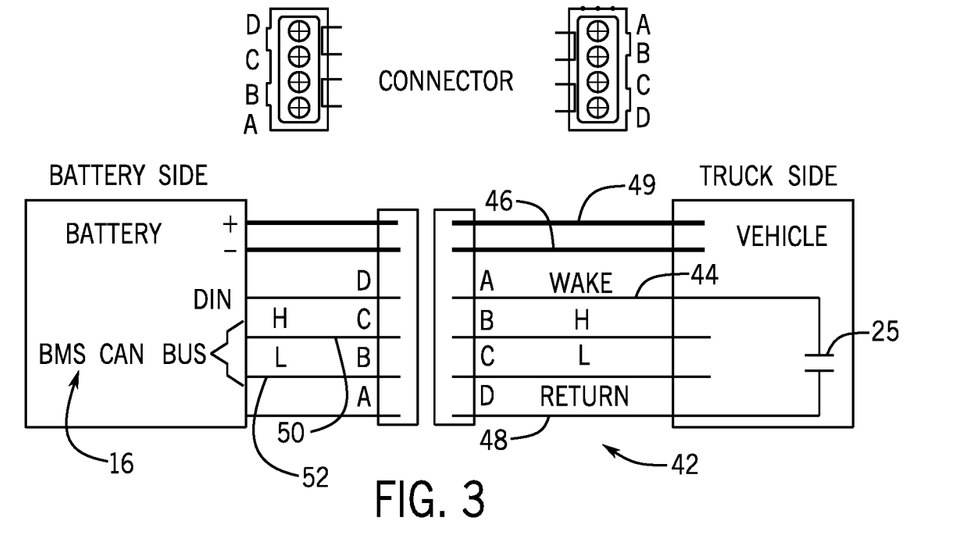
FIG. 3 is an example signal wire pinout for an SBX type connector between another embodiment of a battery management system and a material handling vehicle.
Figure 4:
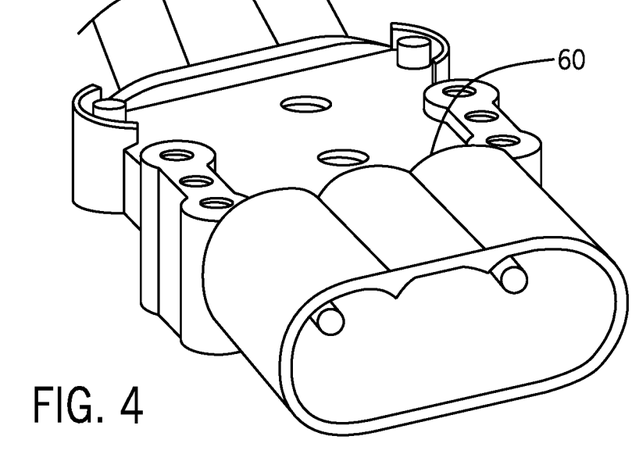
FIG. 4 is a perspective view of an exemplary EBC type connector.
Figure 5:
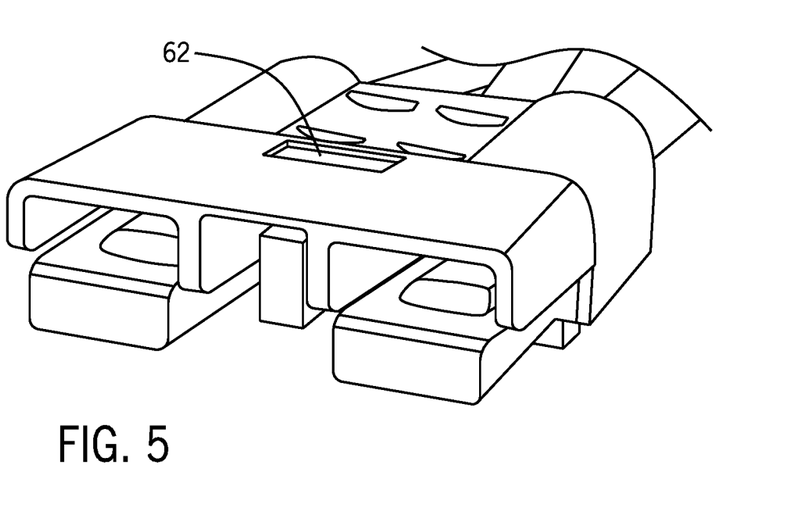
FIG. 5 is a perspective view of an exemplary SBX type connector.
Figure 6:
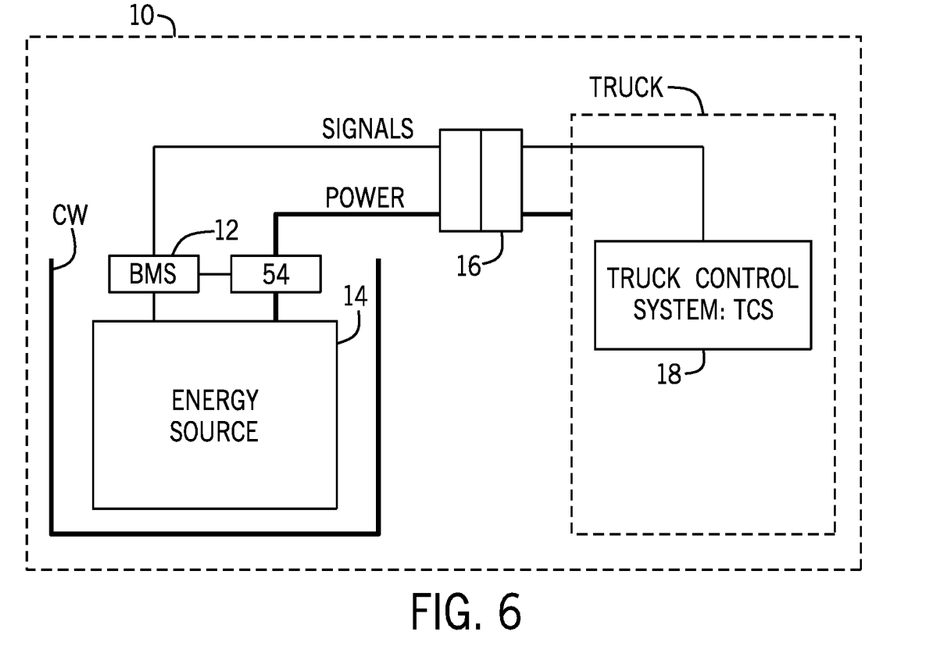
FIG. 6 is a schematic of a system implementing a public standard interface including a battery management system connected to a truck control system.

Referring to FIGS. 2 and 3, the connectors and electrical schematics for some components of embodiments of a system that implements a public standard interface 10 are shown. Note that contact 25 is an optional contact, typically a contact in the vehicle Key ON switch. Contact 25 breaks the WAKE line, thus shutting down the disconnect contactor in the battery and saving the energy required to keep a shut down truck energized. As shown in FIG. 6, the system implementing the public standard interface 10 includes the BMS 12 in communication with the energy source 14, which can be any one or more of the batteries described above to be installed in a material handling vehicle. Also in the material handling vehicle 20 is a Control Area Network (CAN) bus 16 in communication with the material handling vehicle 20. Communication of the energy source 14 with the material handling vehicle 20 and vehicle power are both carried on one standard connector, such as an EBC type connector or an SBX type connector. FIG. 2 shows a first signal wire pinout 40 for an EBC type connector 60 as shown in FIG. 4. FIG. 3 shows a second signal wire pinout 42 for an SBX type connector 62 used for signals and other purposes. The CAN bus 16 is required between the energy source 14 and the material handling vehicle 20. This is done through a single connector 60/62 for both communication and power.

Still referring to FIGS. 2 and 3, with reference to the signal wire pinouts 40, 42, a WAKE UP or WAKE line 44 tells the energy source 14 to supply power when it is shorted to a RETURN line 48. This WAKE UP function removes power from the energy source 14 when it is not plugged into an appropriate material handling vehicle or charger connector. Opening the WAKE line 44 causes the BMS 12 to open the energy source contactor and shut off power to the material handling vehicle 20 (or connection to a charger) in no more than two seconds. The BMS 12 uses the WAKE line 44 to detect when the energy source 14 is plugged into the material handling vehicle 20 and for other purposes when the energy source 14 is plugged into a charger. As further shown in FIG. 2, an H line 50 an L line 52 support the CAN bus 16, which uses the RETURN line 48 as its ground reference. As would be apparent to one of ordinary skill in the art, in material handling vehicles, both the NEGATIVE power cable 46 and the POSITIVE power cable 49 are isolated from the vehicle frame.

As shown in FIG. 6, the BMS 12 communicates via the CAN bus 16 with a truck control system (TCS) 18. In an exemplary embodiment, the BMS 12 controls a battery disconnect switch 54 as seen in FIG. 6. By controlling the battery disconnect switch 54, the BMS 12 protects the energy source 14 by shutting down the energy source 14 when certain identified conditions are satisfied, such as, but not limited to, a minimum level of available power or a minimum temperature. To power the TCS 18, the BMS 12 receives a signal via shorting the WAKE UP line 44 to the RETURN line 48, at which point the BMS 12 closes battery disconnect switch 54 to supply electric power to the TCS 18, thereby starting up the TCS 18. The BMS 12 uses the CAN bus 16 to communicate back to the TCS 18 the following information about limits of the energy source: current limit on discharge current, and current limit on the charge current (e.g., regenerative, regen or plugging current) that can be accepted.

The communication pins between the energy source 14 and the material handling vehicle 20 tolerate shorts to the ground pin and all other pins in the connector 60/62 without damage to the interface. The following list describes the function of the CAN messages defined in the Process Data Objects (PDOs).

PDO1(rx) Sent from the TCS 18 to the BMS 12
  EDP Min Voltage: the minimum voltage the truck can survive without shutting down.
PDO1(tx) sent from the BMS 12 to the TCS 18
  Status: register of bits
    bit 5 Toggle bit to confirm CAN is working
    bit 6 Not used
    bit 7 Battery Disconnect imminent
  Display BSOC: State of Charge displayed for the operator
  Fault Codes: two bytes of codes defined by the battery manufacturer
  Battery voltage: battery output voltage
  Battery current: battery current
PDO2(tx) sent from the BMS 12 to the TCS 18
  Max discharge current: the maximum current that the battery can provide with battery voltage above EDP Min Voltage and will not harm the battery
  Max regenerative current: the maximum charging current that will not harm the battery, or exceed the truck's maximum operating voltage
  Temp. Highest: temperature degrees C. of hottest cell, most recent data
  Temp. Lowest: temperature degrees C. of coldest cell, most recent data
  SOH: State of Health In an exemplary embodiment and referring to FIG. 7, the energy source 14 is charged with an external, separate charger 100 that is not mounted on the material handling vehicle 20. At least the following CAN Interface method is available for charging the energy source. The CAN Interface method of charging can be used when the energy source manufacturer supplies a CAN bus link to communicate with the charger. CiA 418 object definitions are utilized with this method of charging. The BMS 12 controls the charging process by telling the charger 100 Maximum Current AND Maximum Voltage limits throughout the charging process. Other commands to start/stop charging and convey status are implemented by the battery manufacturer to be compatible with the charger 100.

Figure 7:
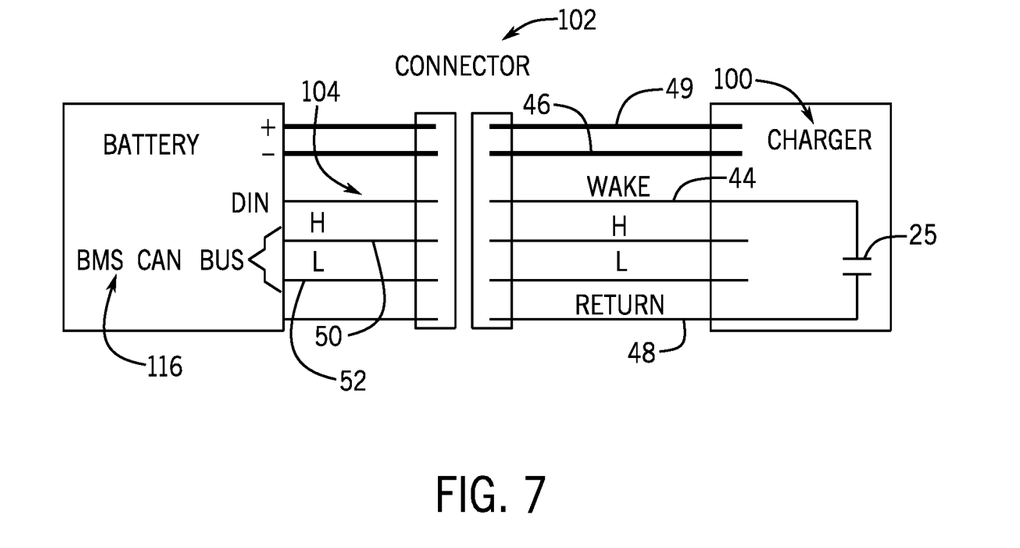
FIG. 7 is an example signal wire pinout for a connector between an embodiment of a battery management system and a charger.

Still referring to FIG. 7, this interface includes a connector 102 having a contact 104 (i.e., the WAKE & RETURN circuit) in the connector 102 to suppress arcing if the operator disconnects the power cables during charging. A communication bus 116 to connect the energy source 14 to the charger 100 is necessary. For the CAN Interface method, the communication bus 116 is a BMS CAN bus connector, which is also used for communication with the material handling vehicle 20. Separation of the contact 104 in the connector 102 from the charger immediately stops charging to suppress arcs. Further, a lack of CAN communication for more than one second shuts down the charging process. For this method, the battery manufacturer is both responsible for the charging profile and establishing communication with the charger.

For the foregoing method of charging, the charger manufacturer provides fully automatic battery charging, including constant current, constant voltage, and finish voltage modes per battery supplier recommendations. The charger manufacturer also provides indications of correct operation. Fault or Status codes should be visible to an operator of the material handling vehicle 20.

The CAN communication protocol supported by the BMS 12 complies with selected parts of the CANopen standards CiA 301 and CiA 418. Multi-byte words are sent as "little endian" (as is mandated by CiA 301). In some embodiments, the CAN is a Standard CAN with 11-bit identifier with a Baud rate of 125 kbit/s, a Sample point of 75%, 3 Samples, and a Synchronization Jump Width of 2. The CAN identifiers are based on CANopen. Node ID BMS=0x1C. The following is for TCS to BMS communication:

| Message Name | CAN ID | Description |
| --- | --- | --- |
| PDO1 (rx) | 0x21C | PDO1 sent by TCS (to BMS) |
| PDO1 (tx) | 0x19C | PDO1 sent by BMS (to TCS) |
| PDO2 (tx) | 0x29C | PDO2 sent by BMS (to TCS) |

The following is for BMS to Charger Control System (CCS) communication:

| Message name | CAN ID | Description |
| --- | --- | --- |
| PDO1 (rx) | 0x22C | PDO1 sent by CCS (to BMS) |
| PDO1 (tx) | 0x1AC | PDO1 sent by BMS (to CCS) |

To ensure that the charger 100 does not interfere with the existing nodes on the material handling vehicle CAN network, the CANopen id 0x2C is reserved for chargers. As an example, CAN COB-IDs 0x1AC, 0x22C, ... are available for communication between the charger 100 and the BMS 12. The BMS 12 boots up and enters the operational state without the need for an NMT message. Further, the BMS 12 shall transmit the PDO message to report any faults. PDO messages are used during operational mode for dynamic data exchange. Up to 4 receive and/or 4 transmit PDO messages may be specified with varying transmission time intervals. Up to 8 bytes of data is contained in each PDO. The Data contained in each PDO along with its transmit time interval shall be static (fixed), and not configurable. Refer to CiA-301 standard for remaining PDO definitions. All PDO's (rx & tx) are sent 50 times a second (having a 20 msec period) or faster. The following is for BMS to TCS Communication:

| Message | Byte 0 | Byte 1 | Byte 2 | Byte 3 | Byte 4 | Byte 5 | Byte 6 | Byte 7 |
| --- | --- | --- | --- | --- | --- | --- | --- | --- |
| 0x200 + Node ID PDO1 (rx) | | EDP: Min Voltage, 0x2005_05 | | | | | | |
| 0x180 + Node ID PDO1 (tx) | Status 0x2000_01 | BSOC, 0x6081_00 | Fault Codes, 0x2005_03 | | Battery voltage, 0x2005_02 | | Battery current, 0x2005_01 | |
| 0x280 + Node ID PDO2 (tx) | Max discharge current, 0x2006_01 | | Max regenerative current, 0x2007_01 | | Temp. Highest, 6010_01 | Temp. Lowest, 6010_02 | SOH 2002_01 | |

The following is for BMS to CCS communication:

| Message | Byte 0 | Byte 1 | Byte 2 | Byte 3 | Byte 4 | Byte 5 | Byte 6 | Byte 7 |
|---|---|---|---|---|---|---|---|---|
| 0x200 + Node ID PDO1 (rx) | TBD | TBD | TBD | TBD | TBD | TBD | TBD | TBD |
| 0x180 + Node ID PDO1 (tx) | Charging Start-Stop 0x2100_01 | BSOC, 0x6081_00 | Temperature highest 6010_01 | Temperature lowest 6010_02 | Battery voltage, 0x2005_02 | | Current Requested, 0x2005_01 | |

The following objects are necessary and/or useful in the interface between the BMS and Charger: 1) BMS request for specific charging current with maximum voltage limit, 2) BMS Start & Stop command; 3) BMS send BSOC to charger for display; 4) BMS sends Hottest Cell and Coldest Cell temperatures for display; 5) BMS sends Battery Voltage.

Service Data Objects (SDO) are used for non-cyclic read and write of data in BMS by TCS (SDO1). The BMS 12 is an SDO server. SDO segmented and expedited transfer is supported (see CiA 301). Below is an example of download and upload of an UNSIGNED 32 (expedited transfer):

SDO read:

| ID | D0 | D1 | D2 | D3 | D4 | D5 | D6 | D7 |
|---|---|---|---|---|---|---|---|---|
| SDO1 (rx) | 0x40 | Index0 | Index1 | Sub index | — | — | — | — |
| SDO1 (tx) | 0x42 | Index0 | Index1 | Sub index | b7 ... b0 | b15 ... b8 | b23 ... b16 | b31 ... b24 |

SDO write:

| ID | D0 | D1 | D | D3 | D4 | D5 | D6 | D7 |
|---|---|---|---|---|---|---|---|---|
| SDO1 (rx) | 0x23 | Index0 | Index1 | Sub index | b7 ... b0 | b15 ... b8 | b23 ... b16 | b31 ... b24 |
| SDO1 (tx) | 0x60 | Index0 | Index1 | Sub index | | | | |

If an object has been accessed incorrectly by an SDO, the BMS shall respond with an SDO abort transfer. Error codes according to CiA301.

The following is an Object Dictionary and Manufacturer Fault Code Table (Note: the Index_subindex labeled with an asterisk * deviate from the CiA 418 object definitions):

| Index_subindex (hex) | Name | Type | Access | Value | Description |
|---|---|---|---|---|---|
| Identification | | | | | |
| 6020_01 | Battery type | UNSIGNED8 | ro | | See CiA 418 appendix A |
| 6020_02 | Ah capacity | UNSIGNED16 | ro | | Rated capacity |
| 6030_00 | Battery serial number | UNSIGNED32 | ro | 1 ... 3 | Highest sub-index supported (CiA 418) |
| 6030_01-3 | Battery serial number | UNSIGNED32 | ro | | Serial number in packed ASCII characters 1-10 (CiA 418) |
| 6031_00 | Battery ID | UNSIGNED32 | ro | 1 ... 5 | Highest sub-index supported (CiA 418) |
| 6031-_01-5 | Battery ID | UNSIGNED32 | ro | | Battery ID in packed ASCII characters 1-20 (CiA 418) |
| 2201_01 | HwPnBase | UNSIGNED32 | ro | | hardware part no base |
| 2201_02 | HwPnExt | UNSIGNED16 | ro | | hardware part no extension |
| 2202_01 | FwPnBase | UNSIGNED32 | ro | | firmware part no base |
| 2202_02 | FwPnExt | UNSIGNED16 | ro | | firmware part no extension |
| 2203_01 | Manufacturer FW version | STRUCT OF UNSIGNED8 UNSIGNED8 UNSIGNED8 | ro | bit 0-7 bit 8-15 bit 16-23 | Manufacturer specific version numbering Major Minor Revision |
| 6020_05 | Weight | UNSIGNED8 | ro | 0-255 | Battery weight, including counter weight, 10 Kg per bit |
| 2004_01 | Current Limit | UNSIGNED16 | ro | 0-65535 | MCNC current limit, 1 A per bit |
| 2001_01 | Charging Start-Stop | UNSIGNED8 | ro | bit 0 bit 1 | Start & Stop bits: Start Bit 0 = 1, Stop Bit 0 = 0 Bit 1 TBD |

-continued

| Index_subindex (hex) | Name | Type | Access | Value | Description |
|---|---|---|---|---|---|
| | | | | bit 2 | Bit 2 TBD |
| | | | | bit 3 | Bit 3 TBD |
| | | | | bit 4 | Bit 4 TBD |
| | | | | bit 5 | Bit 5 TBD |
| | | | | bit 6 | Bit 6 TBD |
| | | | | bit 7 | Bit 7 TBD |
| | | | Instant data | | |
| 2000_01 | Status | UNSIGNED8 | ro | bit 0 | Status bits: |
| | | | | bit 1 | Error active, i.e. any of the bits |
| | | | | bit 2 | 0-4 are set in the error register |
| | | | | bit 3 | (object 1001_00). |
| | | | | bit 4 | Warning active, i.e. bit 7 is set in the error register (object 1001_00) |
| | | | | bit 5 | Error occurred during last |
| | | | | bit 6 | charge |
| | | | | bit 7 | Warning occurred during last charge Not used (should be 0) bit 5 Toggle bit to confirm CAN is working bit 6 TBD bit 7 Battery Disconnect imminent |
| 2002_01 | SOH | UNSIGNED8 | ro | 0-255 | State Of Health (%). |
| 2005_01 | Battery Current | INTEGER16 | ro | −32768-32767 | Battery current, $1/16$ Ampere per bit. Average value during latest second. Discharged current is a negative value. Regenerated current is a positive value. |
| 2006_01 | Max discharge current | UNSIGNED16 | ro | 0-65535 | Present value of maximum discharge current, $1/16$ Ampere per bit. No limit is indicated by value 0xFFFF. |
| 2007_01 | Max regenerative current | UNSIGNED16 | ro | 0-65535 | Present value of maximum regenerative current, $1/16$ Ampere per bit. No limit is indicated by value 0xFFFF. |
| 6010_00 | Temperature high | INTEGER16 | ro | −32768-32767 | Battery temperature, $1/8°$ C. per bit. (CiA 418). If more than one sensor, this parameter indicates the highest temperature. |
| 6010_01* | Temperature highest | UNSIGNED8 | ro | −127-127 | Highest temperature, 1° C. per bit |
| 2008_01 | Temperature low | INTEGER16 | ro | −32768-32767 | Battery temperature, $1/8°$ C. per bit. If more than one sensor, this parameter indicates the lowest temperature. |
| 6010_02* | Temperature lowest | UNSIGNED8 | ro | −127-127 | Lowest temperature, 1° C. per bit |
| 2005_02* | Voltage | UNSIGNED16 | ro | 0-65535 | Battery voltage, $1/100$ Volt per bit. |
| 6081_00* | BSOC | UNSIGNED8 | ro | 0-100 | State of charge (%). (CiA 418) |
| 2005_03 | Fault Codes | UNSIGNED16 | ro | 0-65535 | See Manufacturer's fault code table |
| 2005_05 | EDP Min V | UNSIGNED8 | ro | 0-255 | Minimum Truck Voltage, 1 Volt per bit. |
| | | | Cumulative totals | | |
| 3000_02 | Discharged Ah total | UNSIGNED32 | ro | 0-(2^32-1) | Total Ah discharged, 1 Ah per bit |
| 3000_03 | Regen Ah total | UNSIGNED32 | ro | 0-(2^32-1) | Total Ah regenerated, 1 Ah per bit |
| 6050_00 | Charged Ah | UNSIGNED32 | ro | 0-(2^32-1) | Total Ah charged 1 Ah per bit (CiA 418) |

The following is a Battery Manufacturer Fault Code Table which illustrates the Standard Fault Codes for Object 2005_03. No faults is always 0 decimal. Note: maximum is 65,535 decimal. If the codes shown are inadequate for the new energy source, it is the manufacturer's responsibility to add new rows and publish the expanded table for the public.

| Fault Code, Decimal | Signal/ Functionality | Undesirable Behavior |
|---|---|---|
| 0 | No Faults | |
| 1 | Battery State of Charge | < SOC_WARNING_CAL (example 10% SOC) |
| 2 | Pack Current | Charge current limit exceeded warning (pulse or continuous table) |
| 3 | Pack Current | Discharge current limit exceeded warning (pulse or continuous table) |
| 4 | Pack Current | Charge current limit exceeded error (pulse or continuous table) |
| 5 | Pack Current | Discharge current limit exceeded error (pulse or continuous table) |
| 6 | Voltage Sense Wire | Broken Sense Wire detected |
| 7 | Diagnostic Self-Test | Failed Diagnostic result of Hardware Overvoltage Protection Circuit |
| 8 | Chrgr & Key On Wakes | Charger Connected while Key On |
| 9 | Key On Wake | Loss Of Wake Input |
| 10 | CAN PDO RX | Loss of expected CAN Rx messages |
| 11 | Contactor output meas | Contactor x - open when commanded closed |
| 12 | Contactor output meas | Contactor x - closed/welded when commanded open |
| 13 | Contactor coil meas | Contactor x - invalid coil test |
| 14 | Pack Voltages | Fuse Voltage Measurement is ~0 V |
| 15 | Pack Current | Internal Measurement Loss of Current |
| 16 | Cell Voltages | Internal Measurement Loss of Cell Voltage |
| 17 | Cell Temperatures | Internal Measurement Loss of Temperature |
| 18 | Nonvolatile Memory | Internal Loss of EEPROM storage |
| 19 | Cell Temperatures | Cell Temperature Out of Range Hi (>+65 deg C.*) |
| 20 | Cell Temperatures | Cell Temperature Out of Range Lo (<-40 deg C.*) |
| 21 | Cell Voltages | Cell Voltage Out of Range Hi (>+3.7 V*) |
| 22 | Cell Voltages | Cell Voltage Out of Range Lo (<1.9 V*) |
| 23 | BMS Hardware Self-Test | Power supply or other measurement error |
| 24 | Pack Current | Hardware Over Current Circuit Latched (discharge >2600 A) |
| 25 | Cell Voltages | Hardware Cell Over Voltage Circuit Latched (>4.0 V) |

*signifies default cell voltage or temperature limits unless noted otherwise by the energy source manufacturer.

Another function is the "Max Current with No CAN" (MCNC) function. If the energy source 14 wakes up and has no CAN communication for six seconds, it will limit the current supplied to 50 A. This MCNC function prevents use of the energy source 14 in lift trucks that do not support the public standard interface. Attempting to drive such a material handling vehicle will pull more than 50 A, thus, the BMS 12 will open the energy source contactor for at least six seconds. Cycling the WAKE UP line 44, i.e. unplugging and plugging in again, may be required to power the material handling vehicle 20. After the BMS 12 successfully establishes CAN communication, it will ignore the loss of CAN signal. The material handling vehicle 20 provides a response to the loss of CAN after it is established in a normal wake up. For example, the TCS may shut down the lift motor or limit the speed of all motors unless CAN starts up again. Continued loss of CAN ramps down all motors to either zero or creep mode.

In an exemplary embodiment, the energy source 14 is a Lithium Ion Battery (LIB). The LIB contains the required number of cells that are assembled into modules to provide power at the nominal voltage required for a material handling vehicle 20. The cells are assembled to supply the current required and controlled by the BMS 12. The BMS 12 controls the LIB at all times, and may disconnect the LIB from the material handling vehicle 20. The BMS 12 communicates, using the CAN bus 16, with the material handling vehicle 20 to convey the current and voltage limits it can support along with other status information. The BMS 12 may use the same interface to communicate with the charger 100 to control the energy source charging process. Unless a shutdown is externally requested, the energy source 14 will only disconnect due to extremely low SOC or internal problems. The BMS 12 provides advance notice to the material handling vehicle 20 before disconnecting from the energy source 14 from the material handling vehicle 20. The TCS 18 communicates with the BMS 12 to convey the minimum voltage required to keep the material handling vehicle 20 operating.

Figure 8:
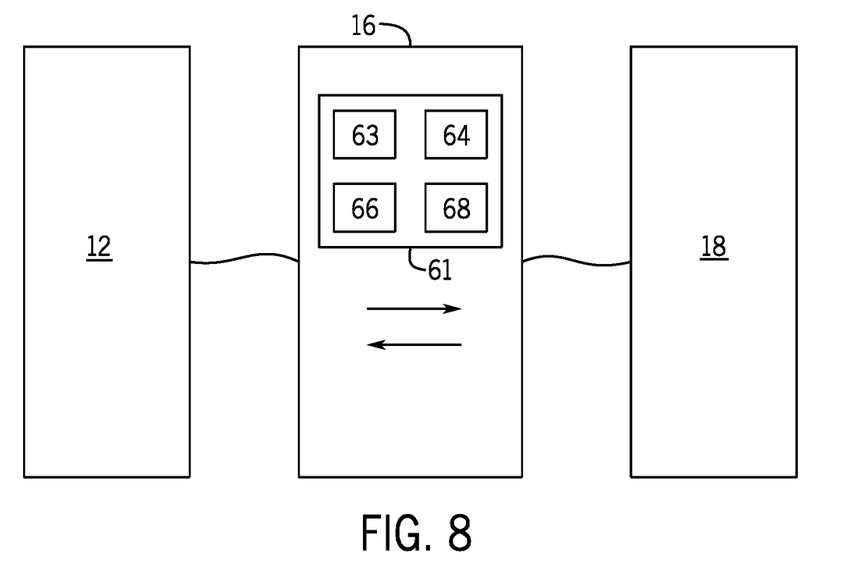
FIG. 8 is a schematic of information transferred between a battery management system and a truck control system.

As shown in FIG. 8, when the BMS 12 is started up by asserting the WAKE line 44, energy source information 61 is transferred between the TCS 18 and the BMS 12 via the CAN bus 16. The energy source information 61 that is transferred may include a weight 63 of the energy source, which may be a weight of the counter weight CW and everything inside of it including the energy source 14, the battery management system 12, and the battery disconnect switch 54, a serial number 64 which identifies the energy source 14, a class 66 of energy source 14, or a type 68 of the energy source 14. The transfer of this information allows the TCS 18 to utilize the energy source information 61 to ensure safe and efficient power consumption by the material handling vehicle 20.

Figure 9:
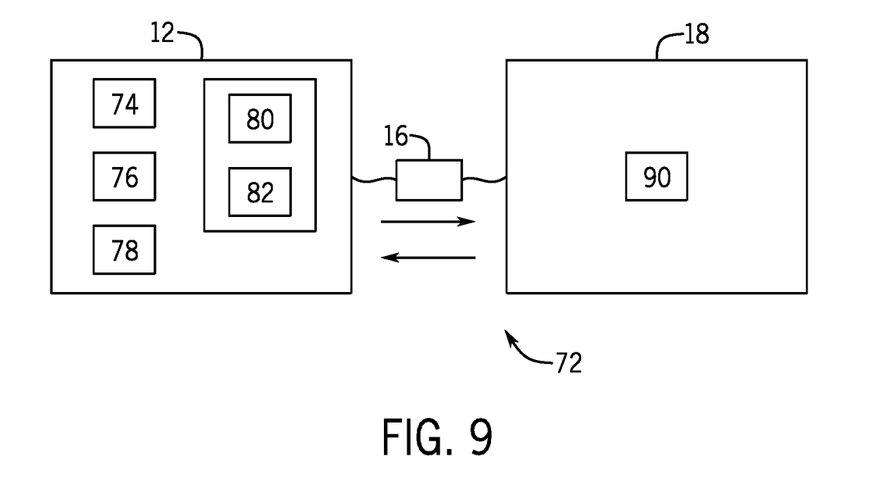
FIG. 9 is a schematic of another mode of operation of the battery management system.

Referring to FIG. 9, during normal operation, the BMS 12 transfers energy source information 61 to support one mode of operation. The TCS 18 also displays to a user if the energy source 14 has a problem such as a low battery state of charge or a high or a low temperature, which must be addressed.

Still referring to FIG. 9, during normal operation, normal mode 72 is a current limit mode. In this mode 72, the BMS 12 communicates a first current limit 74 and a second current limit 76. In some embodiments, the first current limit 74 is a maximum discharge current. Also in some embodiments, the second current limit 76 is a maximum regen current. Both the first current limit 74 and the second current limit 76 are based on a number of factors including a battery state of charge, an operating temperature, and other factors such as a condition of the energy source. The BMS 12 is able to identify a minimum required voltage 78 for the material handling vehicle 20 based on truck information 90 provided by the TCS 18. After receiving the truck information 90 (i.e., EDP Min Voltage), the BMS 12 can calculate the maximum discharge current which will stay above the minimum required voltage.

In an exemplary embodiment, based on the battery state of charge, temperature, and other factors, the BMS 12 calculates a maximum charging current 80 from regeneration or plugging that the energy source 14 can tolerate. Also in some embodiments, the BMS 12 estimates a current internal resistance 82, of the energy source 14. Typically this internal resistance, along with other factors monitored by the BMS, is used to calculate the maximum charging and maximum discharging current levels. How the TCS 18 handles the first current limit 72 and the second current limit 76 varies with truck design, software, and any operator inputs or the configuration of the material handling vehicle 20 or TCS 18.

Referring again to FIG. 7, the connector 102 is disconnected from the material handling vehicle 20 when the charger 100 is connected, although the energy source 14 remains inside the material handling vehicle 20. This is done using the same connector for both powering the truck and charging the energy source 14. The electrical and software interface of this specification does not support both charging the battery and powering the truck at the same time.

The following table illustrates the requirements for the energy source 14 (for example, a LIB) which must be bench tested by the supplier with appropriate lengths (approximately 1M) of wire connected. The bench test shall be done according to applicable parts of EN 12895.

|  | Component test | Truck test (shown here for reference) |
| --- | --- | --- |
| Emission | EN55022 class B 30-230 MHz: 30 dBuV/m 230-1000 MHz: 37 dBuV/m | EN12895 30-75 MHz: 34 dBuV/m 75-400 MHz: 34 to 45 dBuV/m increasing with frequency 400-1000 MHz: 45 dBuV/m (all at 10 meters) |
| Immunity | EN61000-4-3 27-1000 MHz: 20 V/m (an alternative test method EN61000-4-6 may be used in frequency range 27-80 MHz, test level 20 V) | EN12895 27-1000 MHz: 10 V/m |
| ESD | EN61000-4-2 8 kV contact 15 kV air discharge | EN12895 4 kV contact 8 kV air discharge |

The energy source 14 is installed in the material handling vehicle 20 either at the factory and shipped with the completed truck or assembled with the truck at the site. Some of the energy source components may be removed and packaged separately to avoid damage during shipment per recommendation of the energy source supplier. Both the top of the energy source system and the visible sides of any counter weight used should be marked with the following: 1) Battery Manufacturer & Model Number & Serial Number & Date of Manufacture; 2) Battery Nominal Voltage; 3) Battery Nominal Capacity in Ampere Hours; 4) Battery Weight (total weight in pounds with counter weight); 5) Battery Dimensions (total size with counter weight); 6) Safety Labeling; and 7) Storage Warning for shelf life. In some embodiments, the material handling vehicle 20 has a label applied to the control panel or battery compartment indicating that the material handling vehicle 20 has been manufactured or modified to use energy sources that meet this patent's specifications.

The foregoing description was primarily directed to embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not be limited by the above disclosure.

What is claimed is:

1. A system implementing a public standard interface for a material handling vehicle comprising:
an energy source including a battery management system;
a CAN bus comprising an H line, an L line, and separate WAKE and RETURN lines, the CAN bus coupled to the battery management system and in communication with a truck control system of the material handling vehicle, wherein the battery management system uses the WAKE line to detect when the energy source is plugged into the material handling vehicle, and wherein the CAN bus uses the RETURN line as a ground reference;
wherein the battery management system is operable to communicate:
a type of the energy source,
one or more limits of the energy source, and
a battery disconnect imminent warning.

2. The system implementing the public standard interface of claim 1, wherein the WAKE line influences the battery management system and controls a battery disconnect switch.

3. The system implementing the public standard interface of claim 1, wherein the battery management system communicates with the truck control system via the CAN bus.

4. The system implementing the public standard interface of claim 3, wherein the battery management system receives an EDP Min Voltage from the truck control system.

5. The system implementing the public standard interface of claim 1, wherein the CAN bus uses a communication protocol utilizing little endian communication.

6. The system implementing the public standard interface of claim 1, wherein the one or more limits includes a maximum discharge current and a maximum regeneration current.

7. The system implementing the public standard interface of claim 1,
wherein the H Line, the L line, and the WAKE and RETURN lines are included in the same connector that carries power from the energy source.

8. The system implementing the public standard interface of claim 1, wherein the energy source is a Lithium Ion Battery.

9. A system implementing a public standard interface comprising:
an energy source including a lithium ion battery, the energy source having a battery management system in communication therewith;
a CAN bus comprising an H line, an L line, and separate WAKE and RETURN lines, the CAN bus in communication with a material handling vehicle and the battery management system, wherein the battery management system uses the WAKE line to detect when the energy source is plugged into the material handling vehicle, and wherein the CAN bus uses the RETURN line as a ground reference;
wherein the battery management system is operable to communicate;
a weight of the lithium ion battery,
one or more limits of the energy source, and
a battery disconnect imminent warning.

10. The system implementing the public standard interface of claim 9, wherein the battery management system is configured to communicate with a truck control system using the CAN bus.

11. The system implementing the public standard interface of claim 10, wherein the battery management system receives an EDP Min Voltage from the truck control system via the CAN bus.

12. The system implementing the public standard interface of claim 9, wherein the one or more limits include a maximum discharge current and a maximum regeneration current.

13. The system implementing the public standard interface of claim 9,
wherein the H line, the L line, and the WAKE and RETURN lines are included within a single connector that carries power from the energy source to the material handling vehicle.

14. A method of communication between a material handling vehicle and a battery management system comprising:
providing a communication protocol to the material handling vehicle, the material handling vehicle including an energy source;
controlling an energy source disconnect switch;
transferring energy source information between the material handling vehicle and the battery management system using a CAN bus comprising an H line, an L line, and separate WAKE and RETURN lines included in the same connector that carries power from the energy source, wherein the battery management system uses the WAKE line to detect when the energy source is plugged into the material handling vehicle, and wherein the CAN bus uses the RETURN line as a ground reference; and
determining a type of the energy source.

15. The method of communication of claim 14, wherein the energy source information includes a weight of the energy source.

16. The method of communication of claim 14, wherein the energy source information includes an electric current output limit, a power output limit, and an energy output limit of the energy source.

17. The method of communication of claim 14, wherein the energy source information includes a current limit for the energy source.

18. The method of communication of claim 14, further comprising determining a minimum level of energy at which the energy source requires maintenance.

19. The method of communication of claim 14, further comprising determining a maximum discharge current and a maximum regeneration current.

* * * * *